No. 761,438. PATENTED MAY 31, 1904.
M. M. BARR.
AUTOMATIC WEIGHING AND RECORDING DEVICE FOR SCALES.
APPLICATION FILED FEB. 6, 1904.
NO MODEL. 2 SHEETS—SHEET 1.

Witnesses:

Inventor:
Mylin M. Barr,
By J. N. Cooke
Attorney.

No. 761,438. PATENTED MAY 31, 1904.
M. M. BARR.
AUTOMATIC WEIGHING AND RECORDING DEVICE FOR SCALES.
APPLICATION FILED FEB. 6, 1904.
NO MODEL.
2 SHEETS—SHEET 2.
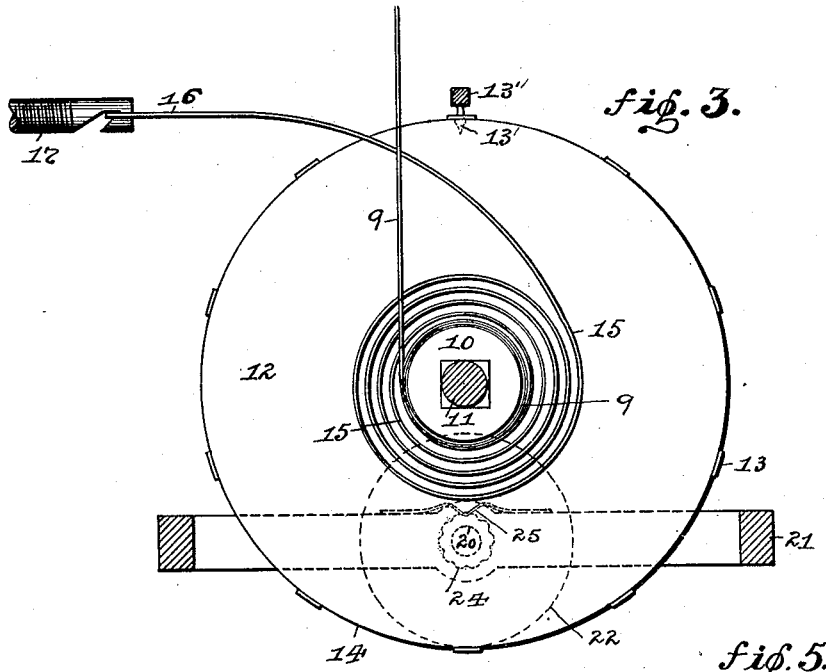
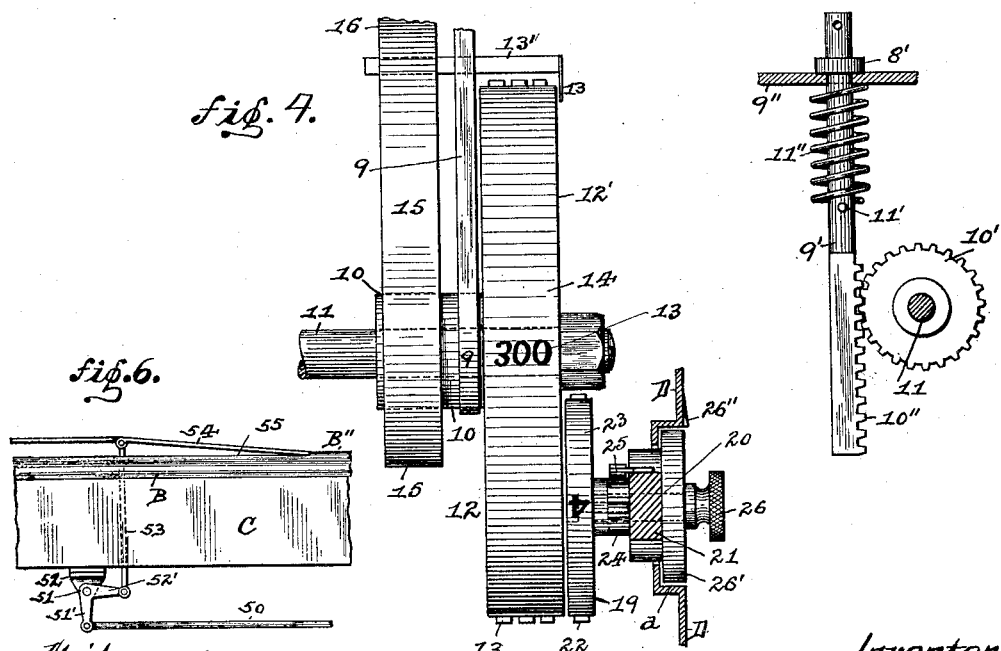
Witnesses:
Inventor:
Mylun M. Barr.
By J. N. Cooke
Attorney.

No. 761,438.

Patented May 31, 1904.

UNITED STATES PATENT OFFICE.

MYLIN M. BARR, OF PITTSBURG, PENNSYLVANIA.

AUTOMATIC WEIGHING AND RECORDING DEVICE FOR SCALES.

SPECIFICATION forming part of Letters Patent No. 761,438, dated May 31, 1904.

Application filed February 6, 1904. Serial No. 192,310. (No model.)

*To all whom it may concern:*

Be it known that I, MYLIN M. BARR, a resident of Pittsburg, in the county of Allegheny and State of Pennsylvania, have invented a new and useful Improvement in Automatic Weighing and Recording Devices for Scales; and I do hereby declare the following to be a full, clear, and exact description thereof.

My invention relates to automatic weighing and recording devices for scales, and has special reference to such devices for the automatic weighing of loaded mine-cars and for recording or printing the weights thereof as each car passes over the scale-platform.

The object of my invention is to provide an automatic weighing and recording scale of a cheap, simple, and efficient construction, whereby each loaded car will be automatically weighed and such weight automatically printed or recorded without stopping the car and as such car passes over the scale-platform on its way from the mine to the tipple to be dumped.

My invention consists, generally stated, in the novel arrangement, construction, and combination of parts, as hereinafter more specifically set forth and described, and particularly pointed out in the claims.

To enable others skilled in the art to which my invention appertains to construct and use my improved scale for automatically weighing and recording the weights of loaded cars, I will describe the same more fully, referring to the accompanying drawings, in which—

Figure 1:
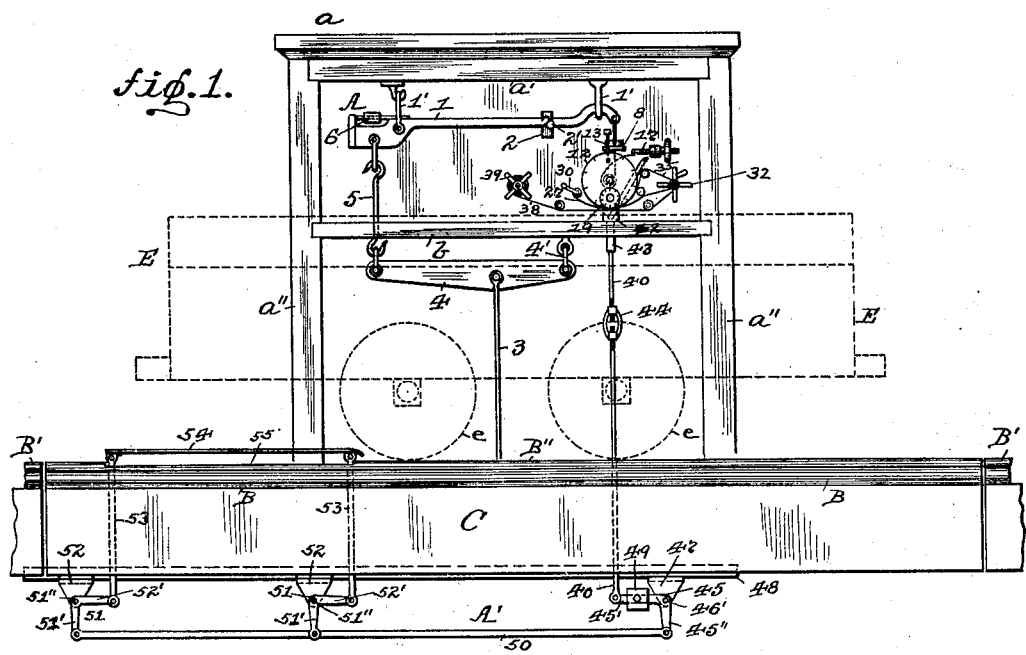
Figure 2:
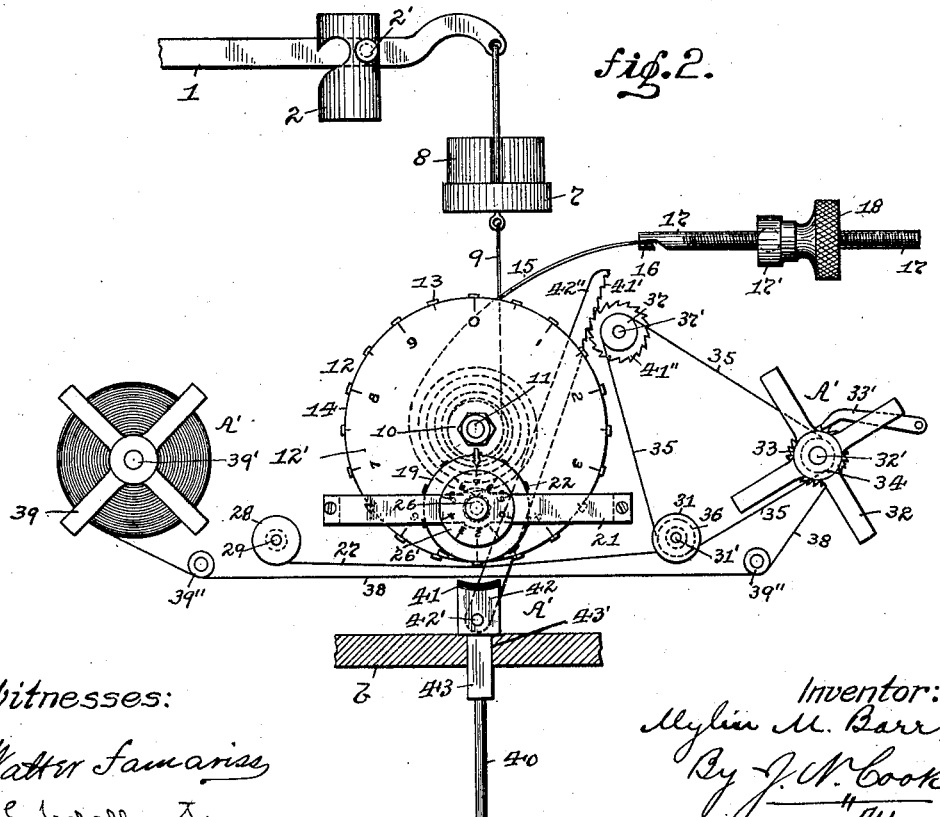

Figure 1 is a side elevation of an apparatus embodying my invention. Fig. 2 is an enlarged side elevation of a portion of said apparatus and showing a part in section. Fig. 3 is an enlarged view of one of the type-wheels looking at the rear or other side of the same from that shown in Fig. 2. Fig. 4 is an enlarged end view of said wheel and its connections. Fig. 5 is a modification showing another manner of operating said type-wheel. Fig. 6 is a modification of another form of the operating-plate and connections.

Like letters or symbols of reference herein indicate like parts in each of the figures of the drawings.

As illustrated in the drawings, 1 represents the beam of the ordinary lever-scale A, which beam is hung or supported from the head $a'$ of a frame $a$ by means of the usual straps 1', and on this beam 1 is the sliding poise 2, provided with the set-screw 2' thereon. The frame $a$ extends up by its uprights $a''$ from any suitable platform or foundation at one side of the railway-track rails B and is provided with the shelf $b$ therein, which is connected to and extends horizontally across and between the said uprights $a''$, such uprights being connected to the head $a'$ of the frame $a$.

C represents the scale-platform, which carries the rails B, and such rails connect with the rails B' of railway-track beyond the scale-platform. Extending up from the scale-platform C on its levers is the rod 3, which is connected to the counterbalancing-beam 4, hung from the shelf $b$ by the strap 4' and connected to the scale-beam 1 by the rod 5, while such scale-beam is provided with the usual counterbalance 6. Connected to and extending down from the scale-beam is the counterpoise 7 for supporting a counter weight or weights 8, and connected to this counterpoise 7 is the chain or strap 9, which passes around and is secured at its end to a drum or hub 10, suitably mounted on a spindle or shaft 11, supported in any desired manner. Mounted on the shaft 11 is the large dial-wheel 12, which is provided with the graduated type or figures 13 on its periphery 14, as well as the like graduated dial-face 12' thereon, and above the wheel 12 is a pointer 13', mounted on a bar 13'', supported in any suitable manner, which always points to the zero-mark on said dial-face 12' when the said wheel 12 is in its normal position. This zero-mark on the face 12 is opposite half of the amount indicated by the numerals on the periphery 14, so that the zero-mark on the periphery is directly under the zero-mark on the face 12 when the wheel is in its normal position. Connected at its end to said hub 10 on said shaft 11 is the leaf-spring 15, which is detachably connected at its free end 16 with an adjusting screw-bar 17, which passes through a brace or support 17', and is provided with a jam-nut 18 thereon for fitting against said support. A small dial-wheel 19 is mounted on a shaft or spindle 20 in the supporting-frame 21 and is provided with the type or figures 22 on its periphery 23, while on this spindle 20 is a gear-wheel 24, which is adapted to be engaged by a spring-bar 25, mounted on the frame 21. A finger-knob 26 is also mounted on said spindle 20 for turning the same and the wheel 19 when desired, while also mounted on this spindle 20 is a dial-plate 26', which is located between the frame 21 and the knob 26, and is adapted to be turned with said spindle and wheel 19 by the knob to indicate the position of said wheel. The dial-plate 26' fits within a seat or recessed portion $d$ of the cover-frame D, and from this frame a pointer 26" extends down adjacent to the dial-plate 26 to indicate the position said plate is to be turned.

Extending along and under the dial-wheels 12 and 19 is the inked ribbon 27 of the recording mechanism A', which is connected to and passes around a spool 28, supported in any suitable manner upon a shaft 29, on which is a crank-lever 30 for winding up said ribbon 27 on the spool 28, and this ribbon is connected to and passes around a spool 31, mounted on a shaft 31'. Mounted on a shaft 32' is a ratchet-wheel 33, with which a pawl 33' is adapted to engage, while a roller 34 is also mounted on the shaft 32' so that a belt 35 can pass around said roller 34, around a roller 36 on the shaft 31', and around a roller 37, mounted on a shaft 37'. The tape or paper strip 38 is located under the ribbon 27 and leads from the loose reel 39 on the shaft 39', so as to pass under the idle rollers 39' to the tape or paper reel 32 on the shaft 32'.

Extending down through the shelf $b$ is the recorder-rod 40 of the recording mechanism A', which is provided with the concave engaging upper face 41, formed on the enlarged head or stamp-pad 42 thereof, and such head or pad is adapted to rest on said shelf $b$ when the rod 40 is in its normal position.

Pivoted at 42' to the head or stamp-pad 42 is the lever 42", which is provided with a cog or ratchet face 41' thereon for engaging with a ratchet-wheel 41", mounted on the shaft 37'. The rod 40 is provided with a flat-sided portion 43 below the head or stamp-pad 42, which is adapted to engage with a like-shaped opening 43' in the shelf $b$ in the movement of said rod. The rod 40 is also provided with a turnbuckle 44 therein for adjusting the head 42, and this rod 40 extends below the scale-platform C, so as to be pivotally connected to an arm 45' of a knee-lever 45, which is pivoted at 46' to a bracket 47, extending down from a beam 48 directly under the frame $a$. The arm 45' of the bell-crank lever 45 is provided with a weight 49 thereon, while the other arm 45" of said lever 45 is pivotally connected to a horizontal rod 50, which is also pivotally connected to the arms 51' of the knee-levers 51, pivoted at 51" to the brackets 52, extending down from the platform C, while the other arms 52' of said levers 51 are pivotally connected to the vertical rods 53, and such rods 53 are pivotally connected to an operating-plate 54, extending normally above the rails B and being adapted to fit within a seat 55, formed in the head B" of said rails B.

The use and operation of my improved automatic weighing and recording devices for scales are as follows: The approximate or average weight of the empty mine-car having been obtained on the scale A, the poise 2 is moved along the beam 1 to the particular position for indicating the amount of said weight, and said poise is set and held at such position by the set-screw 2'. The counterweight 8 is then placed on the counterpoise 7 of an amount, say, one thousand pounds, and this amount is indicated on the small dial-plate 26' by the numeral "1," which is opposite like figures or type 22 on the periphery 23 of the type-wheel 19. The wheel 19 and plate 26' can now be turned by the knob 26 to such a position that the numeral "1" on said plate is opposite the pointer 26", which will also bring the wheel 19 so that the numeral "1" thereon will be opposite the numeral "1" on the plate 26' and in position for working a like numeral on the tape 27 by the operations hereinafter described while such parts are held in this position by the spring-bar 25 engaging with the gear-wheel 24 on the spindle 20. The counterweight 8 will thus assist in weighing the contents of the car E (shown in dotted lines) when said car is run from the rails B' onto the rails B on the platform C of the scale A, and the amount of the counterweight will be indicated by the dial-plate 26' and pointer 26", so that when said car E is passing over the platform C the wheels $e$ on said car in traveling along the rails B on said platform will engage with the operating-plate 54 and will press the said plate down into its seat 55 with the head B" of the rails B in passing over the said rails on the platform C. As this plate 54 is thus pressed down it will also press down the arms 52' on the knee-levers 51 by means of the vertical rods 53 being connected to said plate and rods, and this movement of the arms 52 will also throw back the arms 51' on said levers 51, thereby drawing the rod 50 backward or to the left with said arms 51', and also the arm 45" on the knee-lever 45, which will act to raise the weighted arm 45' on said lever 45 and so raise the rod 40. When this rod 40 is thus raised, the flat portion 43 moves within the opening 43' in the shelf $b$, and the concave face 41 on the head or stamp-pad 42 on said rod presses the tape 38 against the ribbon 27 and at the same time presses said ribbon 27 against the periphery of the large dial-wheel 12. The weight of the car E and its contents will also act through the connection of the platform C or its levers with the rod 3, counterbalancing-beam 4, and its connection with the beam 1 to raise the end of the beam 1, carrying the counterpoise 7 and weight 8, so that the chain or strap 9 will be drawn upward from around the hub 10 on the shaft 11, and thereby turn the dial-wheel 12 on said hub 10, as well as tighten up the leaf-spring 15 around the hub 10 and connected to the bar 17. The dial-wheel 12 is thus turned and the head or stamp-pad 42 is raised at the same time, so that when the parts are counterbalanced by the weight of the car E and its contents the numeral indicating the amount of the balance of the weight from that on the beam 1 and counterweight 8, indicated on the small dial 19, will be brought opposite the face 41 on said head 42 in order that the actual weight of the contents of the car E will be indicated or recorded on the tape 38, pressed by said head against the ribbon 27 in contact with the type 13 and 22 on the wheels 12 and 19, respectively.

When the wheels e of the car E have passed over the operating-plate 54, the said plate will be raised from its seat 55 in the head B″ of the rails B by reason of the weight 49 on the arm 45′ of the knee-lever 45 drawing down the rod 40 and head 42 thereon and pulling forward the arms 45″ 51′ on the knee-levers 45 and 51, respectively, through the medium of the rod 50 being connected to said arms 45″ and 51′, thereby causing the raising of the plate 54 through the rods 53, connected thereto, and to the other arms 52′ of said levers 51. After the wheels e of the car E have passed over the plate 54 and off the platform C the counterpoise 7 and beams connected thereto will be dropped or lowered through the medium of the platform C or its levers with the rod 3, counterbalancing-beam 4, and its connection with said beam 1, which will allow the strap 9 to wind around the hub 10 and the spring 15 to unwind around said hub, thereby enabling the type-wheel 12 to revolve or turn in the opposite direction from that first described, so that the zero-mark on the dial face 12′ again comes under the pointer 13′ and the parts have assumed their normal position ready for another operation of weighing and recording of the next car and the contents thereof.

As the head or stamp-pad 42 on the rod 40 is lowered, as above described, the lever 42″, pivoted to said pad 42 at 42′, is also lowered, and by reason of the ratchet-face 41′ thereon engaging with a notch in the ratchet-wheel 41″ on the shaft 37′ the belt 35, passing around the rollers 34, 36, and 37 on the shafts 32′, 31′, and 37′, respectively, will be moved slightly, and with it the said rollers and shafts, so as to wind up the ribbon 27 around the spool 31 on the shaft 31′ and tape 38 around the reel 32 on the shaft 32′, and the reel 32 in winding up the tape 38 is moved by the pawl 33′ engaging with a notch in the ratchet-wheel 33 on the shaft 32′ and through the medium of the belt 35. In this movement of the ribbon 27 and tape 38 they are unwound from the spool 28 on the shaft 29 and from the loose reel 39 on the shaft 39′, respectively, and during the raising of the pad 42 and rod 40 the ratchet-face 41′ passes over the notches in the ratchet-wheel 41″ without engaging the same. In order to rewind the ribbon 27 in giving the same a new start from the spool 28 around the spool 31, all that is necessary is to turn the crank-lever 30 in the right direction, and thereby cause the ribbon 27 to unwind from around the spool 31 and be wound around the spool 28.

It will be evident that as soon as the wheels e of the car E passes onto the platform C of the scale A the full weight of the car and its contents are on said platform, and the same can be automatically weighed, if desired, without the use of the recording mechanism A′, and in such case the check-weighman can catch and record the amount indicated by the pointer 13′ on the dial-face 12′ on the type-wheel 12 during the movement or turning of said wheel in weighing of the car E and contents thereof in passing over the platform C.

It will also be evident that if desired the strap 9, hub 10, and leaf-spring 15, with its connections, can be dispensed with, and in such case a gear-wheel 10′ can be mounted on the spindle 11 with which a rack 10″ on a vertical rod 9′ engages, such rod passing up through a support or anchor 9″ and being attached to the counterpoise 8 in the ordinary manner. A loose collar 8′ is secured on said rod 9′ for adjusting and limiting the downward movement of the same, and between the anchor 9″ and a pin 11′ on the rod 9′ is interposed a spiral spring 11″, so that in the weighing or recording the weight of the car E and its contents the rod 9′ will be raised by the counterpoise 8, thereby turning the type-wheel 12 in the spindle 11 by reason of the gear-wheel 10′ on said spindle engaging with the rack 10″ on said rod and compressing the spring 11″ between the anchor 9″ and the pin 11′. When the rod 9′ is lowered by the counterpoise 8 dropping after the car and its contents have been weighed or recorded, the tensions on the spring 11″ will be released, and the rack 10″ on the rod 9′, engaging with the gear-wheel 10′ on the spindle 11, will act to turn the type-wheel 12 on said spindle in a reverse direction, so that the parts are ready for another operation.

It will of course be understood that my improved weighing and recording device for scales can be used in the weighing of cars and their contents other than mine-cars and a number of such cars and their contents can be automatically weighed or recorded at the same time and by the use of a single platform-scale, and it will be further understood that, if desired, a single vertical rod can be used to connect the operating-plate with the knee-lever on the platform and be stationed at or about the center of said plate, in which case the operating-plate can be inclined upwardly from the center of platform, if desired, in order to insure the easy passing of the car-wheels upon and over the same, as shown in Fig. 6.

Various other modifications and changes in the construction, design, and operation of my improved automatic weighing and recording device for scales may be resorted to without departing from the spirit of the invention or sacrificing any of its advantages.

It will thus be seen that my improved weighing and recording device for scales is quick and positive in its action and operation, and by its use cars and their contents can be easily and rapidly weighed or recorded automatically without the use of any operators or check-weighmen and such weights be actually made and separately recorded while the cars are passing along over the scale-platform.

It will also be observed that heavier weights can be placed on the counterpoise and the small type-wheel and its dial set to said amount, so that heavier loaded cars can be weighed and such weights recorded, the beam being used for the weight of the empty car and the large type-wheel being used for the number of pounds and fractions under a thousand in determining the actual weight of the contents of the car beyond that weighed and indicated by the counterpoise and small type-wheel and dial.

The parts are not liable to get out of order and are strong and durable, while, if desired, the ink-ribbon when worn out or requiring new inking can be easily and quickly removed and replaced, as well as the tape, when filled up or necessitating removal and replacing at any time.

What I claim as my invention, and desire to secure by Letters Patent, is—

1. In an automatic weighing-scale, the combination of a scale-beam having a poise thereon and set for the weight of the empty car, a scale-platform connected to said beam by levers and having rails thereon for the passing of the loaded car to be weighed over the same, a weighted counterpoise connected to the end of said beam, an indicator-wheel having a dial and adapted to be set to indicate an amount equal to that of the counterpoise in weighing a portion of the contents of the car, another indicator-wheel provided with a dial, a spring extending around said shaft and connected to the same and to a support for returning said last-named wheel to its normal position after the car has passed over the platform, and connections between said counterpoise and last-named wheel for operating said wheel in weighing and displaying the actual amount of the contents of the car with the first-named wheel while the loaded car is passing over the platform.

2. In an automatic weighing-scale, the combination of a scale-beam having a poise thereon and adapted to be set for the weight of the empty car, a scale-platform connected to said beam by levers and having rails thereon for the passing of the loaded car to be weighed over the same, a weighted counterpoise connected to the end of said beam, an indicator-wheel having a dial and adapted to be set to indicate an amount equal to that of the counterpoise in weighing a portion of the contents of the car, another indicator-wheel mounted on a shaft and provided with a dial, a spring extending around said shaft and connected to the same and to a support for returning said last-named wheel to its normal position after the car has passed over the platform, and connections between said counterpoise and said shaft for operating said last-named wheel in weighing and displaying the actual amount of the contents of the car by said indicator-wheels while the loaded car is passing over the platform.

3. In an automatic weighing-scale, the combination of a scale-beam having a poise thereon and set for the weight of the empty car, a scale-platform connected to said beam by levers and having rails thereon for the passing of the loaded car to be weighed over the same, a weighted counterpoise connected to the end of said beam, an indicator-wheel having a dial and adapted to be set to indicate an amount equal to that of the counterpoise in weighing a portion of the contents of the car, another indicator-wheel mounted on a shaft and provided with a dial, a strap connected to said counterpoise and shaft for operating said last-named wheel in weighing and displaying the actual amount of the contents of the car by said indicator-wheels while the loaded car is passing over the platform, and a spring extending around said shaft and connected to the same and to a support for returning said last-named wheel to its normal position after the car has passed off the platform.

4. In an automatic weighing and weight-recording scale, the combination of a scale-beam having a poise thereon and set for the weight of an empty car, a scale-platform connected to said beam by levers and having rails thereon for the passing of the loaded car to be weighed and recorded over the same, an operating-lever on said platform adapted to be engaged by said car, a weighted counterpoise connected to the end of said beam and wheel having type thereon, an inked ribbon adapted to engage said type, a tape adapted to engage said ribbon, means for automatically moving said ribbon and tape after each recording on said tape by said wheel, connections between said counterpoise and wheel for operating said wheel in weighing the amount of the contents of the loaded car while said car is passing over the platform, a stamp-pad, and means connecting said operating-lever and said stamp-pad for moving the stamp-pad to press the ribbon against the type on the wheel and the tape against said ribbon in recording the amount of the weight of the car contents while said car is passing over said platform.

5. In an automatic weighing and weight-recording scale, the combination of a scale-beam having a poise thereon and set for the weight of an empty car, a scale-platform connected to said beam by levers and having rails thereon for the passing of the loaded car to be weighed and recorded over the same, an operating-lever on said platform adapted to be engaged by said car, a weighted counterpoise connected to the end of said beam, a wheel having type thereon, an inked ribbon adapted to engage said type, a tape adapted to engage said ribbon, means for automatically moving said ribbon and tape after each recording on said tape by said wheel, connections between said counterpoise and wheel for operating said wheel in weighing the amount of the contents of the loaded car while said car is passing over said platform, a stamp-pad, knee-levers on said platform and at the side of the same, and rods connected to said stamp-pad, knee-levers and said operating-lever for moving said stamp-pad to press the ribbon against the tape on the wheel and the tape against the said ribbon in recording the amount of the weight of the car contents while said car is passing over said platform.

6. In an automatic weighing and weight-recording scale, the combination of a scale-beam having a poise thereon and set for the weight of the empty car, a scale-platform connected to said beam by levers and having rails thereon for the passing of the loaded car to be weighed over the same, a weighted counterpoise connected to the end of said beam, a type-wheel provided with a dial and adapted to be set to indicate an amount equal to that of the counterpoise in weighing a portion of the car contents, another type-wheel, an inked ribbon adapted to engage said type-wheels, a tape adapted to engage said ribbon, means for automatically moving said ribbon and tape after each recording on said tape by said wheels, connections between said counterpoise and said last-named type-wheel for operating said wheel in weighing the amount of the contents of the loaded car in passing over said platform, an operating-lever on said platform adapted to be engaged by said car, a stamp-pad, and means connecting said operating-lever and stamp-pad to press the ribbon against the type on said wheels and the tape against said ribbon in recording the amount of the weight of the car contents while said car is passing over said platform.

7. In an automatic weighing and weight-recording scale, the combination of a scale-beam having a poise thereon and set for the weight of the empty car, a scale-platform connected to said beam by levers and having rails thereon for the passing of the loaded car to be weighed over the same, a weighted counterpoise connected to the end of said beam, a type-wheel provided with a dial and adapted to be set to indicate an amount equal to that of the counterpoise in weighing a portion of the car contents, another type-wheel, an inked ribbon adapted to engage said type-wheels, a tape adapted to engage said ribbon, means for automatically moving said ribbon and tape after each recording on said tape by said wheels, connections between said counterpoise and said last-named type-wheels for operating said wheel in weighing the amount of the contents of the loaded car in passing over said platform, an operating-lever on said platform adapted to be engaged by said car, a stamp-pad, knee-levers on said platform and at the side of the same, and rods connected to said stamp-pad, knee-levers and said operating-lever for moving said stamp-pad to press the ribbon against the type on the said wheels and the tape against said ribbon in recording the amount of the weight of the car contents while said car is passing over said platform.

8. In an automatic weighing and weight-recording scale, the combination of a scale-beam having a poise thereon and set for the weight of an empty car, a scale-platform connected to said beam by levers and having rails thereon for the passing of the loaded car to be weighed and recorded over the same, an operating-lever on said platform adapted to be engaged by said car, a weighted counterpoise connected to the end of said beam, a wheel having type thereon, connections between said counterpoise and wheel for operating said wheel in weighing the amount of the contents of the loaded car while said car is passing over the platform, an inked ribbon adapted to engage said type, a tape adapted to engage with said ribbon, a stamp-pad, means connecting said operating-lever and said stamp-pad for moving said pad to press the ribbon against said type and the tape against said ribbon in recording the amount of the weight of the car contents while said car is passing over said platform, and means connected to said stamp-pad for moving said ribbon and tape after each recording on said tape by said type-wheel.

9. In an automatic weighing and weight-recording scale, the combination of a scale-beam having a poise thereon and set for the weight of an empty car, a scale-platform connected to said beam by levers and having rails thereon for the passing of the loaded car to be weighed and recorded over the same, an operating-lever on said platform adapted to be engaged by said car, a weighted counterpoise connected to the end of said beam, a wheel having type thereon, connections between said counterpoise and wheel for operating said wheel in weighing the amount of the contents of the loaded car while said car is passing over the platform, an inked ribbon passing around spools mounted on shafts and adapted to engage with said type, a tape passing around reels mounted on shafts and adapted to engage with said ribbon, a stamp-pad, means connecting said operating-lever and said stamp-pad for moving said pad to press the ribbon against said type and the tape against said ribbon in recording the amount of the weight of the car contents while said car is passing over said platform, a shaft carrying a roller, a belt passing around said roller and around rollers on the spool and reel shafts, a ratchet-wheel on said roller-shaft, and a lever pivoted to said stamp-pad and provided with a rack-face thereon for engaging with said ratchet-wheel to move said ribbon and tape after each recording on said tape by said type-wheels.

10. In an automatic weighing and weight-recording scale, the combination of a scale-beam having a poise thereon and set for the weight of an empty car, a scale-platform connected to said beam by levers and having rails thereon for the passing of the loaded car to be weighed and recorded over the same, an operating-lever on said platform adapted to be engaged by said car, a weighted counterpoise connected to the end of said beam, a type-wheel provided with a dial and adapted to be set to indicate an amount equal to that of the counterpoise in weighing a portion of the car contents, another type-wheel, an inked ribbon adapted to engage with the type on said wheels, a tape adapted to engage said ribbon, a stamp-pad, means connecting said operating-lever and said stamp-pad for moving said pad to press the ribbon against the type on said wheels and the tape against said ribbon in recording the amount of the weight of the car contents while said car is passing over said platform, and means connected to said stamp-pad for moving said ribbon and tape after each recording on said tape by said type-wheels.

11. In an automatic weighing and weight-recording scale, the combination of a scale-beam having a poise thereon and set for the weight of an empty car, a scale-platform connected to said beam by levers and having rails thereon for the passing of the loaded car to be weighed and recorded over the same, an operating-lever on said platform adapted to be engaged by said car, a weighted counterpoise connected to the end of said beam, a type-wheel provided with a dial and adapted to be set at an amount to counterbalance the weighted counterpoise in weighing a portion of the car contents, another type-wheel, an inked ribbon passing around spools mounted on shafts and adapted to engage with the type on said wheels, a tape passing around reels mounted on shafts and adapted to engage with said ribbon, a stamp-pad, means connecting said operating-lever and said stamp-pad for moving said pad to press the ribbon against the type on said wheels and the tape against said ribbon in recording the amount of the weight of the car contents while said car is passing over said platform, a shaft carrying a roller, a belt passing around said roller and around rollers on the spool and reel shafts, a ratchet-wheel on said roller-shaft, and a lever pivoted to said stamp-pad and provided with a rack thereon for engaging with said ratchet-wheel to move said ribbon and tape after each recording on said tape by said type-wheels.

In testimony whereof I, the said MYLIN M. BARR, have hereunto set my hand.

MYLIN M. BARR.

Witnesses:
J. N. COOKE,
J. L. TREFALLER, Jr.